United States Patent
Choi et al.

(10) Patent No.: US 10,452,431 B2
(45) Date of Patent: Oct. 22, 2019

(54) DATA PROCESSING SYSTEM AND OPERATING METHOD THEREOF

(71) Applicant: SK hynix Inc., Gyeonggi-do (KR)

(72) Inventors: An-Ho Choi, Gyeonggi-do (KR); Jun-Seop Chung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 128 days.

(21) Appl. No.: 15/444,823

(22) Filed: Feb. 28, 2017

(65) Prior Publication Data

US 2018/0052710 A1 Feb. 22, 2018

(30) Foreign Application Priority Data

Aug. 19, 2016 (KR) .................. 10-2016-0105400

(51) Int. Cl.
*G06F 9/48* (2006.01)
(52) U.S. Cl.
CPC .................. *G06F 9/4881* (2013.01)

(58) Field of Classification Search
CPC .................................................... G06F 9/4881
See application file for complete search history.

(56) References Cited

U.S. PATENT DOCUMENTS

2009/0292865 A1 11/2009 Hong
2014/0372706 A1* 12/2014 Nawab Ali ......... G06F 12/0891
711/135

FOREIGN PATENT DOCUMENTS

KR 101417236 7/2014
KR 10-2017-0060300 6/2017

* cited by examiner

*Primary Examiner* — Sisley N Kim
(74) *Attorney, Agent, or Firm* — IP & T Group LLP

(57) ABSTRACT

A memory system may include: a memory device; and a controller, wherein the controller includes: a receiving unit suitable for receiving a plurality of tasks from a host; and a task processing unit suitable for re-arranging the plurality of the tasks based on the number of the plurality of the tasks and a priority order, and performing the re-arranged tasks.

13 Claims, 11 Drawing Sheets

DATA PROCESSING SYSTEM AND OPERATING METHOD THEREOF

CROSS-REFERENCE TO RELATED APPLICATIONS

The present application claims priority of Korean Patent Application No. 10-2016-0105400, filed on Aug. 19, 2016, which is incorporated herein by reference in its entirety.

BACKGROUND

1. Field

Exemplary embodiments of the present invention relate to a data processing system and a data processing method.

2. Description of the Related Art

The computer environment paradigm has shifted to ubiquitous computing systems that can be used anytime and anywhere. Due to this fact, use of portable electronic devices such as mobile phones, digital cameras, and notebook computers has rapidly increased. These portable electronic devices generally use a memory system having memory devices, that is, a data storage device. The memory system may be used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Embodiments of the present invention are directed to an apparatus and method for processing commands in a data processing system including a host and a peripheral device.

In accordance with an embodiment of the present invention, an apparatus may include a receiving unit suitable for receiving a plurality of tasks from a host; and a task processing unit suitable for re-arranging the plurality of the tasks based on a number of the plurality of the tasks and a priority order, and performing the re-arranged tasks.

In accordance with another embodiment of the present invention, a memory system may include a memory device; and a controller. The controller may comprise a receiving unit suitable for receiving a plurality of tasks from a host; and a task processing unit suitable for re-arranging the plurality of the tasks based on a number of the plurality of the tasks and a priority order, and performing the re-arranged tasks.

In accordance with yet another embodiment of the present invention, a method for operating a memory system including a memory device and a controller, may include: receiving a plurality of tasks from a host; and re-arranging the plurality of the tasks based on a number of the plurality of the tasks and a priority order and performing the re-arranged tasks.

DETAILED DESCRIPTION

Figure 1A:
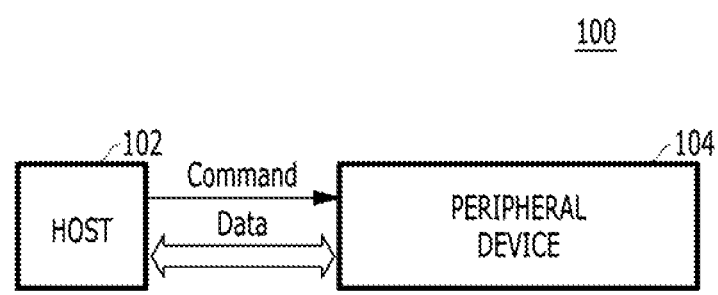
FIGS. 1A to 1C are block diagrams illustrating a data processing system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 1B:
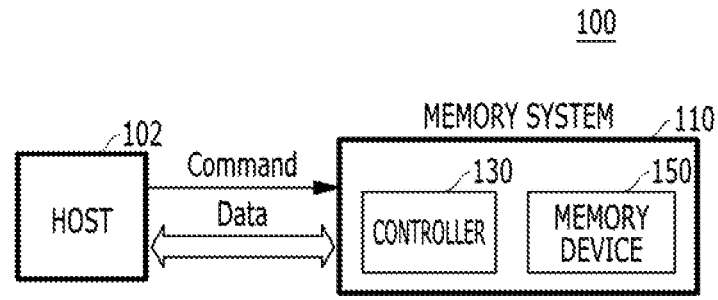
Figure 1C:
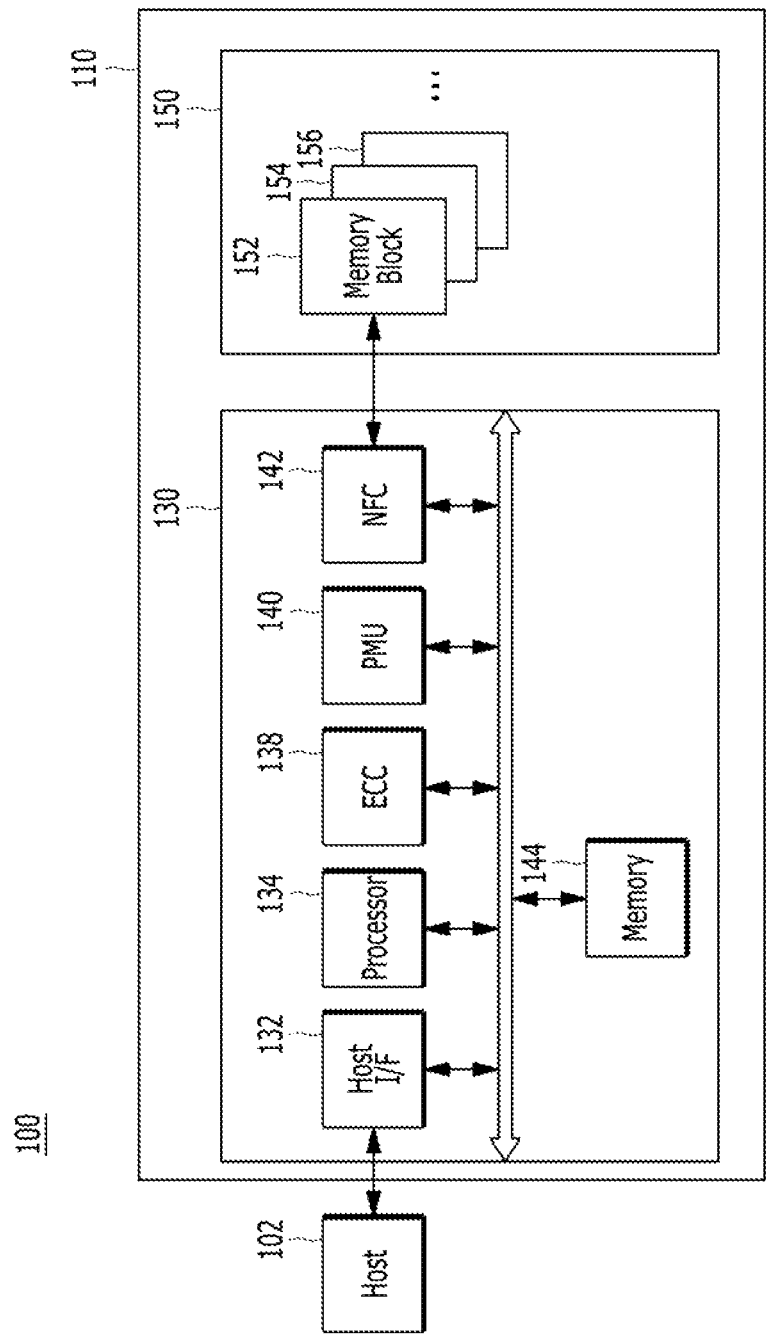

FIGS. 1A to 1C are block diagrams illustrating a data processing system 100 in accordance with an embodiment of the present invention.

Referring to FIG. 1A, the data processing system 100 may include a host 102 and a peripheral device 104. The peripheral device 104 may receive a command from the host 102 and exchange data according to the command. For example, the host 102 may be a computer, a server, a smart phone and the like, and the peripheral device 104 may be a mobile or storage product.

Referring to FIGS. 1B and 1C, the peripheral device 104 shown in FIG. 1A may be implemented by a memory system 110. That is, the data processing system 100 may include the memory system 110 coupled to the host 102. The host 102 may include, for example, a portable electronic device such as a mobile phone, an MP3 player and a laptop computer or a non-portable electronic device such as a desktop computer, a game player, a television (TV) and a projector.

The memory system 110 may operate in response to a request from the host 102. For example, the memory system 110 may store data to be accessed by the host 102. The memory system 110 may be used as a main memory system or an auxiliary memory system of the host 102. The memory system 110 may be implemented with any one of various storage devices, according to the protocol of a host interface to be coupled electrically with the host 102. The memory system 110 may be implemented with any one of various storage devices, such as a solid state drive (SSD), a multi-media card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM) and a flash memory.

The memory system 110 may include a memory device 150 which stores data to be accessed by the host 102, and a controller 130 which may control storage of data in the memory device 150.

The controller 130 and the memory device 150 may be integrated into one semiconductor device. For instance, the controller 130 and the memory device 150 may be integrated into one semiconductor device configured as a solid state drive (SSD). When the memory system 110 is used as an SSD, the operation speed of the host 102 that is electrically coupled with the memory system 110 may be significantly increased.

The controller 130 and the memory device 150 may be integrated into one semiconductor device configured as a memory card, such as a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

For instance, the memory system 110 may configure a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when a power supply to the device is interrupted. In particular, the memory device 150 may store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled. The memory device 150 may be a nonvolatile memory device such as a flash memory. The flash memory may have a three-dimensional (3D) stack structure.

The controller 130 of the memory system 110 may control the memory device 150 in response to a request from the host 102. The controller 130 may provide the data read from the memory device 150 to the host 102, and store the data provided from the host 102 into the memory device 150. To this end, the controller 130 may control overall operations of the memory device 150, such as read, write, program and erase operations.

For example, the controller 130 may include a host interface unit 132, a processor 134, an error correction code (ECC) unit 138, a power management unit (PMU) 140, a NAND flash controller (NFC) 142, and a memory 144 operatively coupled via an internal bus.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on any one of coded modulation such as a low density parity check (LDPC) code, a Bose-Chaudhurl-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all suitable circuits, systems or devices for the error correction operation.

The PMU 140 may provide and manage power for the controller 130, that is, power for the component elements included in the controller 130. Any suitable PMU may be employed.

The NFC 142 is an example of a memory interface between the controller 130 and the memory device 150 allowing the controller 130 to control the memory device 150 in response to a request from the host 102. For example, the NFC 142 may generate control signals for the memory device 150 and process data under the control of the processor 134 when the memory device 150 is a flash memory. In particular, when the memory device 150 is a NAND flash memory, the NFC 142 may generate control signals for the memory device 150 and process data under the control of the processor 134. When the memory device 150 is not a NAND flash memory, other well-known memory interfaces may be employed that are suitable for serving as a memory interface between the controller 130 and the memory device 150 for allowing the controller 130 to control the memory device 150 in response to a request from the host 102.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150, for such operations as read, write, program and erase operations.

The memory 144 may be implemented with a volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control the operations of the memory system 110 including a write operation or a read operation for the memory device 150, in response to a write request or a read request from the host 102. The processor 134 may drive firmware such as a flash translation layer (FTL), for controlling the operations of the memory system 110. For example, the processor 134 may be implemented with a microprocessor. Also, as an example, the processor may be implemented with a central processing unit (CPU).

Other units may also be employed. For example, a bad block management unit (not shown) may be included in the processor 134 for performing bad block management of the memory device 150. The bad block management unit may find bad memory blocks included in the memory device 150, which are in an unsatisfactory condition for further use, and perform bad block management on the bad memory blocks. For example, when the memory device 150 is a flash memory, such as, a NAND flash memory, a program failure may occur during a write operation, also referred to as a program operation, due to a characteristic of a NAND logic function. During a bad block management operation, the data of the program-failed memory block or the bad memory block may be programmed into a new memory block. The bad memory block may then be disabled. Hence, to reduce deterioration of the utilization efficiency of the memory device 150 having a 3D stack structure and to protect the reliability of the memory system 100, any suitable bad block management unit and method may be employed. Hereinafter, with reference to figures FIG. 2 to FIG. 4, a memory device in a memory system in accordance with embodiments of the present invention will be described.

Figure 2:
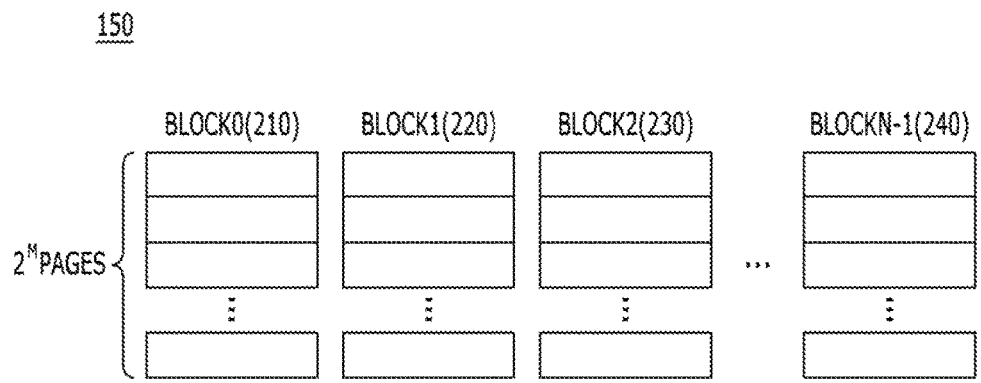
FIG. 2 is a diagram illustrating an example of a memory device employed in the memory system of FIG. 1C.
Figure 3:
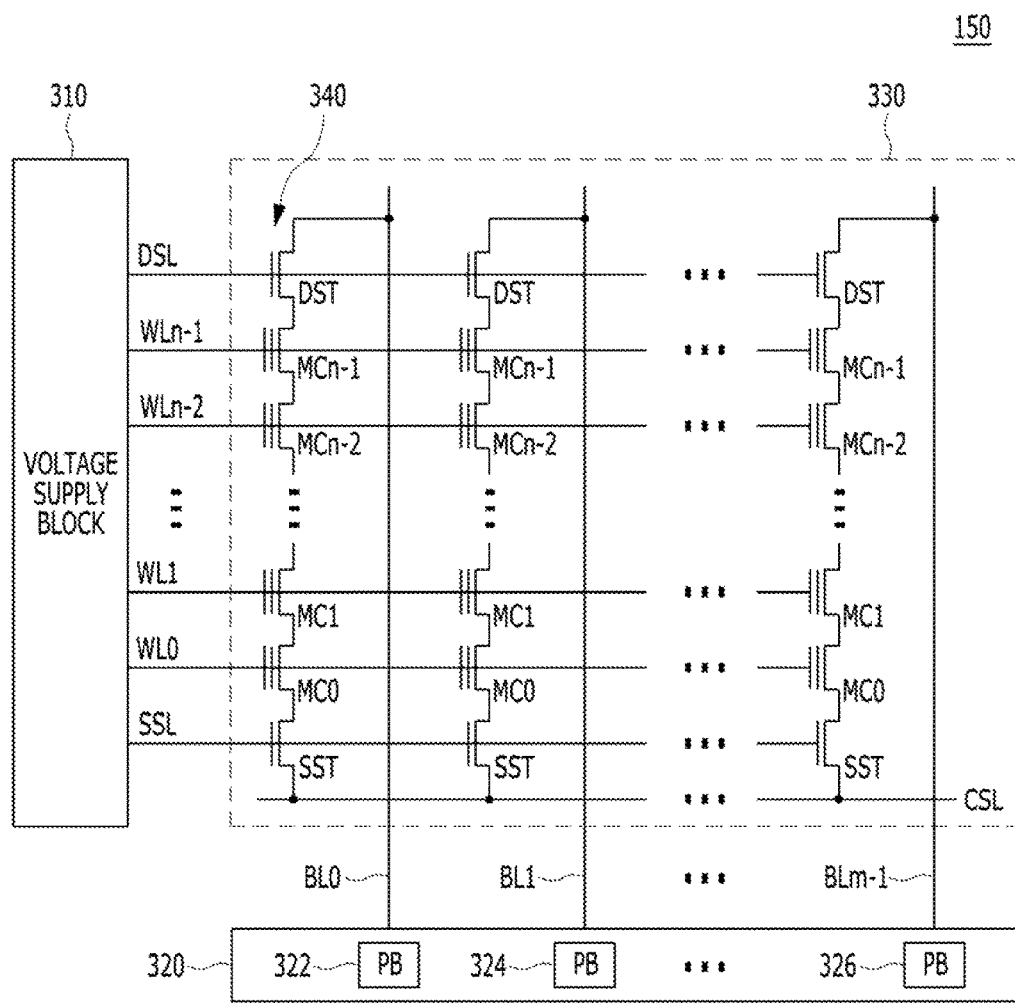
FIG. 3 is a circuit diagram illustrating a memory block in a memory device, according to an embodiment of the present invention.
Figure 4:
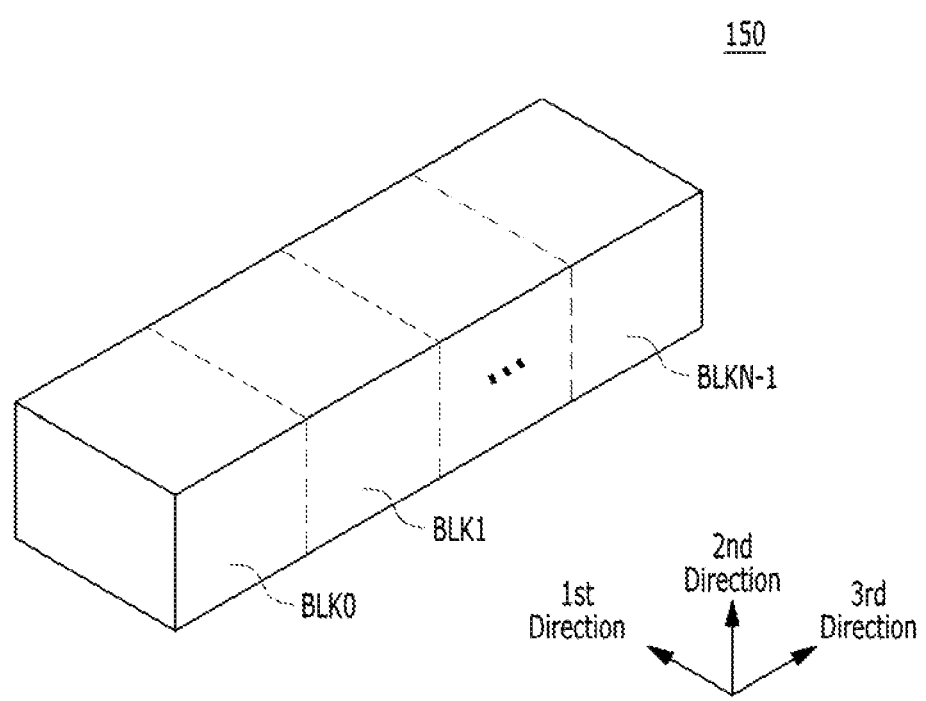
FIG. 4 is a diagram illustrating the memory blocks of the memory device of FIG. 2.

FIG. 2 is a diagram illustrating a configuration example of the memory device 150 of FIG. 1C, according to an embodiment of the present invention. FIG. 3 is a circuit diagram illustrating a memory block 152 of the memory device 150 in FIG. 1C. FIG. 4 is a block diagram illustrating an example of the memory device 150 of FIG. 1C.

Referring to FIG. 2, the memory device 150 may include a plurality of memory blocks 210 to 240. For example, the memory device 150 may include zeroth to (N−1)$^{th}$ memory blocks 210 to 240. Each of the plurality of memory blocks 210 to 240 may include a plurality of pages. For example, each of the plurality of memory blocks 210 to 240 may include $2^M$ number of pages ($2^M$ PAGES), to which the present invention will not be limited. Each of the plurality of pages may include a plurality of memory cells electrically coupled to a word line.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data for example, two or more-bit data. The MLC memory block including a plurality of pages which are implemented with memory cells that are each capable of storing 3-bit data may be also referred to as a triple level cell (TLC) memory block.

Each of the plurality of memory blocks 210 to 240 may store the data provided from the host 102 during a write operation, and may provide stored data to the host 102 during a read operation.

Referring to FIG. 3, the memory block 152 of the memory device 150 may include a plurality of cell strings 340 which are electrically coupled to a plurality of bit lines BL0 to BLm−1, respectively. Each cell string 340 may include at least one drain select transistor DST and at least one source select transistor SST. Each cell string 340 may also include a plurality of memory cells MC0 to MCn−1 or a plurality of memory cell transistors electrically coupled in series between the at least one drain select transistor DST and the at least one source select transistor SST. Each of the memory cells MC0 to MCn−1 may be configured by a multi-level cell (MLC) which stores data information as a plurality of bits. Each of the strings 340 may be electrically coupled to a corresponding bit line among the plurality of bit lines BL0 to BLm−1. For reference, in FIG. 3, 'DSL' may denote a drain select line, 'SSL' may denote a source select line, and 'CSL' may denote a common source line.

While FIG. 3 illustrates, as an example, the memory block 152 of the memory device 150 which is configured by NAND flash memory cells, it is noted that the memory block 152 is not limited to NAND flash memory cells. For example, according to other embodiments, the memory block 152 may be implemented with NOR flash memory cells or hybrid flash memory cells in which at least two kinds of memory cells are combined. In an embodiment, the memory block 152 may be implemented as a one-NAND flash memory in which a controller is built in a memory chip. In an embodiment, the memory device 152 may be a flash memory device in which a charge storing layer is configured by conductive floating gates. In an embodiment, the memory device 152 may be a charge trap flash (CTF) in which a charge storing layer is configured by a dielectric layer.

A voltage supply block 310 of the memory device 150 may provide word line voltages such as a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during a program operation, and may drive the bit lines according to the received data. To this end, the read/write circuit 320 may include a plurality of page buffers 322, 324 and 326 respectively corresponding to columns or bit lines, or pairs of columns or pairs of bit lines, and a plurality of latches (not shown) may be included in each of the page buffers 322, 324 and 326.

Referring to FIG. 4, the memory device 150 may include a plurality of memory blocks BLK0 to BLKN−1, each of the memory blocks BLK0 to BLKN−1 being implemented in a three-dimensional (3D) structure also referred to as a vertical structure. Each of the memory blocks BLK0 to BLKN−1 may include structures which extend in first to third directions. The respective memory blocks BLK0 to BLKN−1 may include a plurality of cell strings for example, a plurality of NAND strings, each cell string extending in the second direction such as, in the vertical direction. The plurality of NAND strings may be spaced apart at regular intervals in the first and second directions. Each NAND string may be electrically coupled to a bit line, at least one source select line or at least one ground select line, at least one drain select line or at least one string select line, a plurality of word lines, at least one dummy word line, and a common source line. That is, the respective memory blocks BLK0 to BLKN−1 may be electrically coupled to a plurality of bit lines, a plurality of source select lines, a plurality of drain select lines, a plurality of word lines, a plurality of dummy word lines, and a plurality of common source lines.

Figure 5:
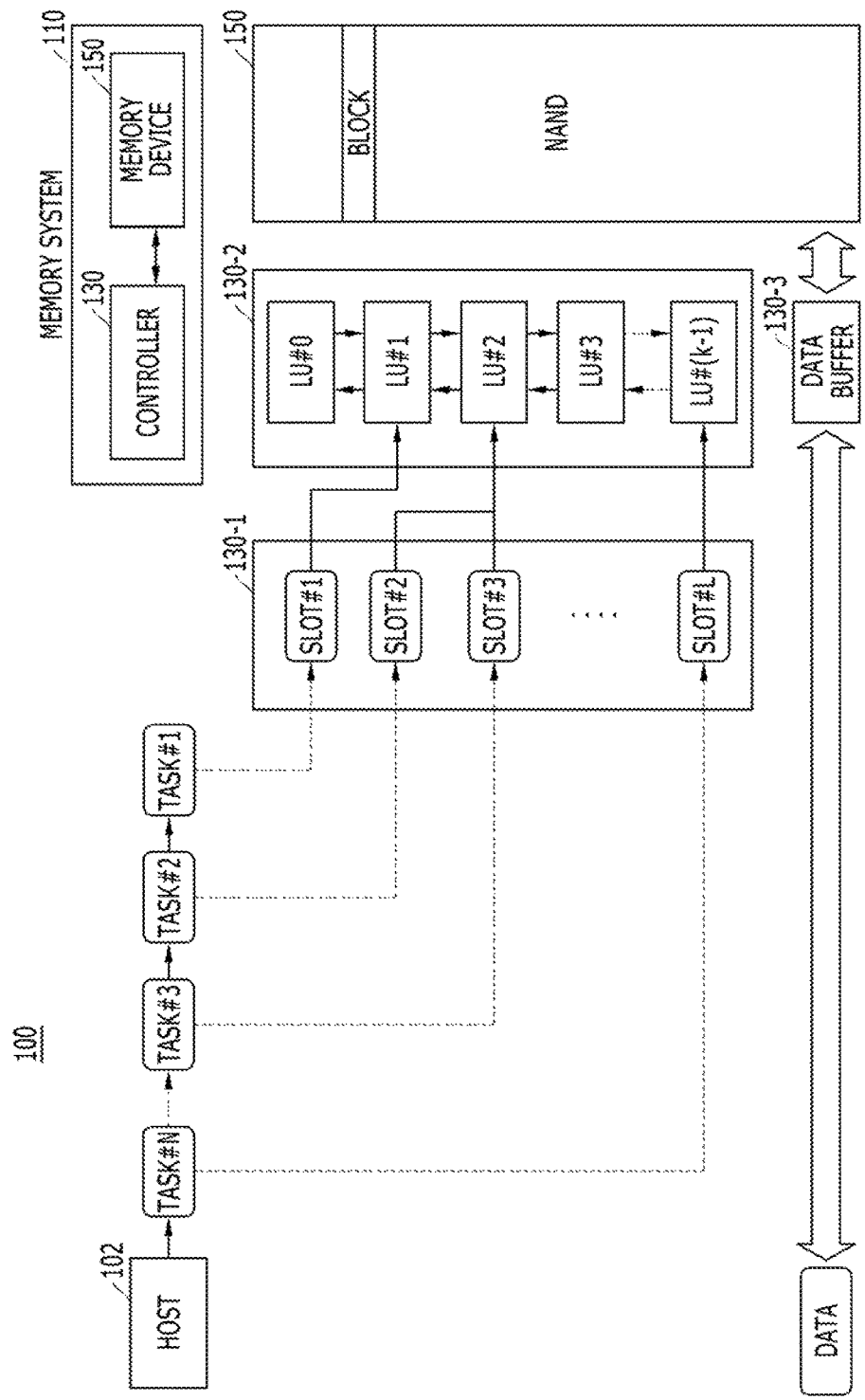
FIG. 5 is a diagram illustrating an operation of a data processing system including a memory system in accordance with an embodiment of the present invention.

FIG. 5 is a diagram illustrating an operation of a data processing system 100 including a memory system 110 in accordance with an embodiment of the present invention.

Referring to FIG. 5, the data processing system 100 may include a host 102 and a memory system 110, which is a peripheral device of the host 102, such as a storage device. The memory system 110 may include a controller 130 and a memory device 150.

The host 102 may generate and transfer a plurality of tasks for one or more commands to the memory system 110. For example, the plurality of tasks may include N tasks Task#1 to Task#N. A task may be defined as an operation that is performed by the memory system 110 based on one command as the memory system 110 transfers/receives commands and data to/from the host 102, and the task is related to an operation of the memory system 110. For example, the tasks may include search, change, read and write operations of system data for the memory system 110, and read and write operations for the memory device 150. However, the concept and spirit of the present invention are not limited to these examples. In some embodiments of the present invention, the memory device 150 may be a non-volatile memory device, such as a NAND flash memory. The memory device 150 may include a plurality of memory blocks as a data storage region.

The host 102 may exchange data with the memory system 110. The controller 130 may choose a queue for transferring/receiving data to/from the host 102. To this end, the controller 130 may include a data buffer 130-3. For example, the data buffer 130-3 may be realized by a static random access memory (SRAM). According to some embodiments of the present invention, the data buffer 130-3 may be included in a memory 144 illustrated in FIG. 1C. According to another embodiment of the present invention, the data buffer 130-3 may be provided separately from the memory 144.

During a write operation, the controller 130 may store data that are transferred from the host 102 in the data buffer 130-3, and then move the data into a particular memory block of the memory device 150 and store the data therein based on an order. During a read operation, the controller 130 may read the data that are stored in a particular memory block of the memory device 150 and then store the data in the data buffer 130-3. Subsequently, the controller 130 may transfer the data stored in the data buffer 130-3 to the host 102 based on an order. If the data that is requested to be written/read by the host 102 is stored in the data buffer 130-3, the controller 130 may not perform any write operation/read operation on the memory device 150.

Also, the controller 130 of the memory system 110 may receive tasks from the host 102, and choose a queue for performing the received tasks. To this end, the controller 130 may include a receiving unit 130-1 and a task processing unit 130-2.

The receiving unit 130-1 may receive a plurality of tasks from the host 102 through a plurality of slots. For example, the plurality of slots may include L slots Slot#1 to Slot#L, and each of the plurality of tasks may be matched to one slot.

The task processing unit 130-2 may re-arrange the tasks based on the number of the tasks and the priority order of the tasks, and perform the re-arranged tasks. To re-arrange the tasks, the task processing unit 130-2 may include a command queue which includes a plurality of queues of a logical unit LU. For example, the plurality of queues may include k LU queues LU#0 to LU#(k−1). The LU is a unit for processing a task. The LU of the memory device 150 may be defined as a unit for reading/write data. For example, when the memory device 150 is a NAND flash memory, the LU may be 8/16/32 KB according to the NAND structure. If the memory system 110 uses an LU with 16 KB, the controller 130 may perform a write operation by grouping two write tasks with 8 KB into one write set. The task processing unit 130-2 may have increased task processing capability and process the command queue without a command or data miss by efficiently matching a slot including the task transferred from the host 102 to an LU used by the controller 130. The task processing unit 130-2 may perform a task processing operation as shown in the following flowchart of FIG. 6A or 6B.

Figure 6A:
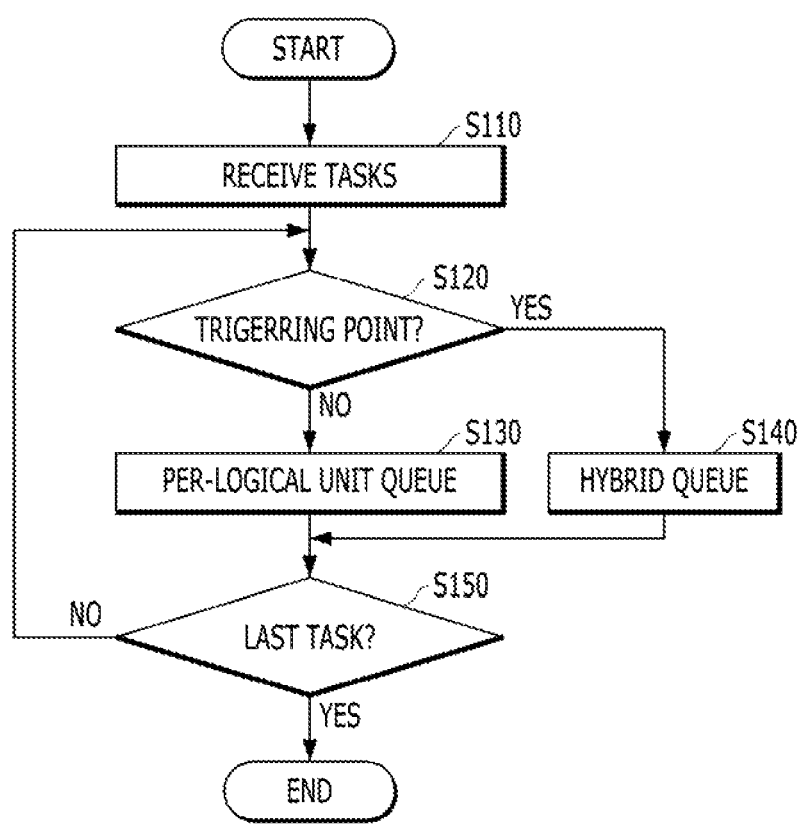
FIGS. 6A and 6B are flowcharts illustrating examples of a process for processing a task in a memory system in accordance with an embodiment of the present invention.
Figure 6B:
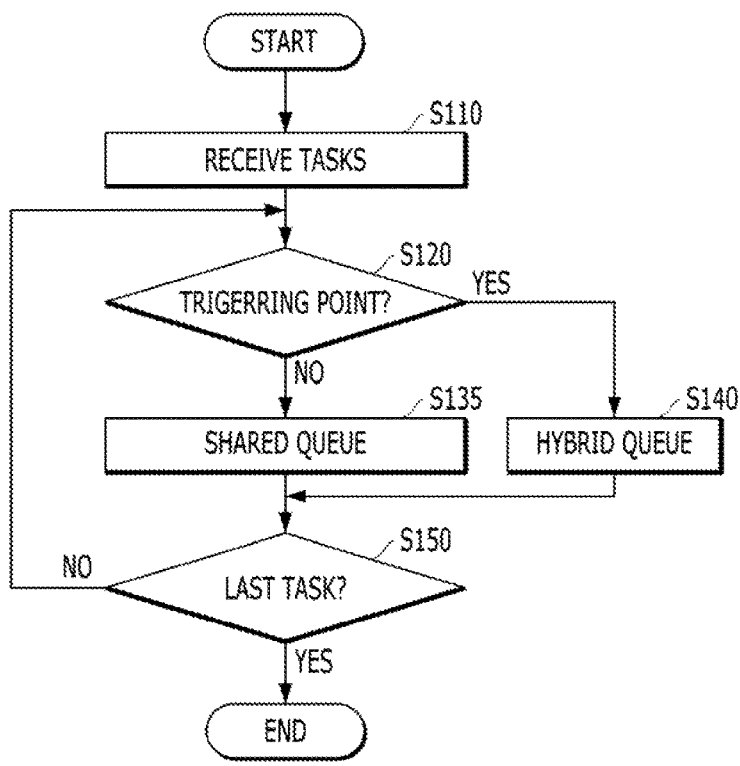

FIGS. 6A and 6B are flowcharts illustrating examples of a process for processing a task in a memory system in accordance with an embodiment of the present invention. The operations shown in the flowcharts may be performed by the receiving unit 130-1 and the task processing unit 130-2 of the controller 130 illustrated in FIG. 5.

Referring to FIG. 6A, the receiving unit 130-1 may receive one or more tasks from the host 102 in step S110.

The task processing unit 130-2 may decide whether a triggering point has been reached or not, in step S120. The task processing unit 130-2 may decide whether a triggering point has been reached or not based on the number of the tasks and a predetermined number of effective queues.

When it is not decided in the step S120 that a triggering point has been reached (S120, NO), the task processing unit 130-2 may process the received tasks based on a per-logical unit queue scheme. Conversely, when it is decided in the step S120 that a triggering point has been reached (S120, YES), the task processing unit 130-2 may process the received tasks based on a hybrid queue scheme. The per-logical unit queue scheme will be described later with reference to FIG. 7, and the hybrid queue scheme will be described later with reference to FIG. 9. According to the hybrid queue scheme, the tasks are performed in the order of ordered→priority→normal→simple or ordered→priority→simple→normal. That is, the tasks are performed in the priority order (Tables 2 to 4). Examples of the priority order are presented in the following Tables 2 to 4. Herein, if there are a host-ordered CMD with the top priority and simple tasks, the tasks are assigned to the first completed LU and then processed in the hybrid queue scheme.

The task processing unit 130-2 may perform the task processing operation until a received task is determined to be a last task in step S150. The drawing shows only a case in which the task processing operation is performed until the last task of a first group from the initially received task, is received. If the task processing operation is performed on the tasks of a second group after the task processing operation on the last task of the first group is finished, the task processing operation may be performed in the hybrid queue scheme.

Referring to FIG. 6B, the receiving unit 130-1 may receive one or more tasks from the host 102 in step S110.

The task processing unit 130-2 may decide whether a triggering point has been reached or not in step S120. The task processing unit 130-2 may decide whether a triggering point has been reached or not based on the number of the tasks and a predetermined number of effective queues.

When it is not determined in the step S120 that a triggering point has been reached (S120, NO), the task processing unit 130-2 may process the received tasks based on a shared queue scheme. Conversely, when it is determined in the step S120 that a triggering point has been reached (S120, YES), the task processing unit 130-2 may process the received tasks based on the hybrid queue scheme. The shared queue scheme will be described later with reference to FIG. 8, and the hybrid queue scheme will be described later with reference to FIG. 9.

The task processing unit 130-2 may perform the task processing operation until a received task is determined to be a last task in step S150. The drawing shows only a case in which the task processing operation is performed until the last task of a first group from the initially received task, is received. If the task processing operation is performed on the tasks of a second group after the task processing operation on the last task of the first group is finished, the task processing operation may be performed in the hybrid queue scheme.

In some embodiments of the present invention, when the number of tasks is N, the triggering point x may be determined by a quotient in a calculation of N/Q. Herein, Q is a theoretic value of a queue providing the maximal performance, which may be an approximate 70% value of an effective queue number. For example, since it is generally observed that the maximal performance appears when there are 8 queues, the value of Q may be decided as '6'.

An example of determining the triggering point is shown in the following Table 1.

TABLE 1

| Total Task N | Q (Effective Queue No.) | x | Trigger | Queue Group |
|---|---|---|---|---|
| 1 | 6 (8) | 0 | | |
| 2 | 6 (8) | 0 | | |
| 3 | 6 (8) | 0 | | |
| 4 | 6 (8) | 0 | | |
| 5 | 6 (8) | 0 | | |
| 6 | 6 (8) | 1 | Triggering | 1st group (1-6) |
| 7 | 6 (8) | 1 | | |
| 8 | 6 (8) | 1 | | |
| 9 | 6 (8) | 1 | | |
| 10 | 6 (8) | 1 | | |

TABLE 1-continued

| Total Task N | Q (Effective Queue No.) | x | Trigger | Queue Group |
|---|---|---|---|---|
| 11 | 6 (8) | 1 | | |
| 12 | 6 (8) | 2 | Triggering | 2nd group (7-12) |

As shown in Table 1, the number Q of the effective queues is 6, that is, Q=6, the triggering point x is increased to 1, when the total number N of tasks is 6, that is, N=6, and then the triggering point x is increased to 2, when the total number N of tasks is 12, that is, N=12. The tasks that are received before the triggering point x may form one task processing group. For example, the tasks Task1 to Task6 that are received before the triggering point x (x=1) may form a first task group, and the tasks Task7 to Task12 that are received before the triggering point x (x=2) may form a second task group. As shown in FIGS. 6A and 6B, the tasks of the first task group may be processed in the per-logical unit queue scheme or the shared queue scheme, and the tasks of the second task group may be processed in the hybrid queue scheme.

According to the flowcharts of FIGS. 6A and 6B, the controller 130 defines the triggering point x as a quotient of N/Q. Herein, N may be the total number of the tasks, and Q may be a theoretic value of a queue providing the maximal performance, which may be a predetermined ratio of the number of the effective queues, for example, an approximate 70%. The controller 130 may maximally use the logical unit (LU) in the per-logical unit queue scheme or the shared queue scheme before the triggering point x is reached. When the triggering point x is reached, the controller 130 may perform the tasks. When the triggering point x is reached, the controller 130 may process all the tasks that are received before and stored in the queues, and then process the tasks that are received after the triggering point x. Herein, the controller 130 may process the tasks based on the priority order. In short, the controller 130 may process the tasks that are transferred from the host 102 based on the triggering point or the sequential order that the tasks are received, and the priority order.

The priority order of the tasks may be pre-defined as shown in the following Table 2. The order for processing the tasks may be decided in such a manner that a task that is requested by the host 102 to be processed with a priority is processed on a top priority and then the tasks of the peripheral device 104 which receives a command from the host 102 is processed. In short, the order for processing the tasks may be decided in consideration of the efficiency of the memory system 110. For example, the priority order of tasks may be decided in the sequential order of Ordered→Priority 1 & Priority 2→Simple 1 & Simple 2→Normal 1 & Normal 2. Herein, "Ordered" is a task that is requested by the host 102 to be processed with a priority, and "Priority 1" is a task that related to the memory system 110. "Priority 2" is a command marked with a high priority. "Simple 1" is a task for a short-time process, for example, a single read task, and "Simple 2" is a task for a middle-time process, for example, a multi read task or a single write task. "Normal 1" is a task for an ordinary read operation, and "Normal 2" is a task for an ordinary write operation.

TABLE 2

| Hybrid Order | Definition |
| --- | --- |
| Ordered | Host Order (High Priority) |
| Priority 1 | System relative |
| Priority 2 | CMD High Priority Marking |
| Simple 1 | Short Time (Single Read) |
| Simple 2 | Middle Time (Multi read or single write) |
| Normal 1 | Read |
| Normal 2 | Write |

The following Table 3 and Table 4 show priority examples of the tasks that are processed in the hybrid queue scheme. The Order1 case shown in Table 3 is an example in which the priority order is decided in the sequential order of System Data for example: search and read of system data by the host, and write and change of the system data→Read for example: data read of a high priority, and data read of a low priority→Write for example: data write of a high priority→a small amount of data for example: single block write→a large amount of data for example: data write of a low priority or multiple blocks. The Order2 case shown in Table 4 is an example in which the priority order is decided in the sequential order of System Data for example: change of the system data by the host, read and write of the system data→High Order for example: read and write of data of a high priority→Read for example: ordinary data read→Write for example: ordinary data write. The Order1 case may quickly cope with the task requested by the host 102, but the efficiency of processing simple tasks is relatively slow. On the other hand, the Order2 case may process the tasks requested by the host 102 and simple tasks evenly in general.

TABLE 3

| Hybrid Order | Order 1 Case |
| --- | --- |
| Ordered | System Data Search and Read by Host |
| Priority 1 | System Data Write and Change |
| Priority 2 | Data Read High Order |
| Simple 1 | Data Read Low Order |
| Simple 2 | Data Write High Order |
| Normal 1 | Single Block Write |
| Normal 2 | Data Write (Multi Block or Low Order) |

TABLE 4

| Hybrid Order | Order 2 Case |
| --- | --- |
| Ordered | System Data Change by Host |
| Priority 1 | System Data Read |
| Priority 2 | System Data Write |
| Simple 1 | Data Read High Order |
| Simple 2 | Data Write High Order |
| Normal 1 | Data Read |
| Normal 2 | Data Write |

According to the embodiments of the present invention, an operation of collecting the tasks for processing received commands which is transferred from the host 102, and re-arranging the order in an efficient way, and processing the re-arranged tasks may be performed in the per-logical unit queue scheme, the shared queue scheme, and/or the hybrid queue scheme.

Figure 7:
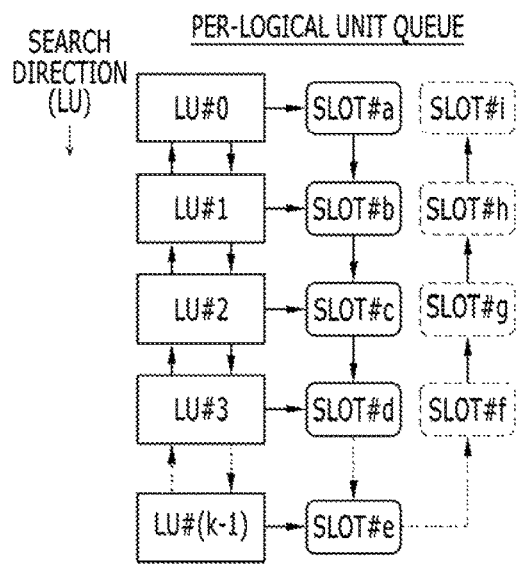
FIG. 7 illustrates a task processing operation in accordance with an embodiment of the present invention.

FIG. 7 illustrates a task processing operation in accordance with an embodiment of the present invention. In this embodiment, the task processing operation is performed based on the per-logical unit queue scheme.

Referring to FIG. 7, the per-logical unit queue scheme is a method of performing tasks or slots, one by one based on the logical units (LU) or queues. For example, a slot SLOT#a corresponding to a logical unit LU#0 is processed; a slot SLOT#b corresponding to a logical unit LU#1 is processed; a slot SLOT#c corresponding to a logical unit LU#2 is processed; and a slot SLOT#d corresponding to a logical unit LU#3 is processed. Subsequently, a slot SLOT#e corresponding to a logical unit LU#(k−1) is processed. Then, a slot SLOT#f corresponding to a logical unit LU#3 is processed; a slot SLOT#g corresponding to a logical unit LU#2 is processed; a slot SLOT#h corresponding to a logical unit LU#1 is processed; and a slot SLOT#i corresponding to a logical unit LU#0 is processed.

According to the per-logical unit queue scheme, the controller 130 may match the tasks that are transferred from the host 102 to the logical units or queues for the memory device 150, store the tasks in the matched logical units or queues, sequentially search the queues of the logical units and process the tasks. The per-logical unit queue scheme may be advantageous when the logical units of the controller 130 are used efficiently.

Furthermore, the controller 130 may correspond priority orders to the slots corresponding to the logical units LU as shown in Table 5, when the per-logical unit queue scheme is used.

TABLE 5

| Slot | Order |
| --- | --- |
| SLOT #a | Ordered |
| SLOT #b | Priority1 |
| SLOT #c | Simple1 |
| SLOT #d | Priority2 |
| SLOT #e | Simple2 |
| SLOT #f | Priority1' |
| SLOT #g | Simple1' |
| SLOT #h | Priority2' |
| SLOT #i | Simple2' |

Figure 8:
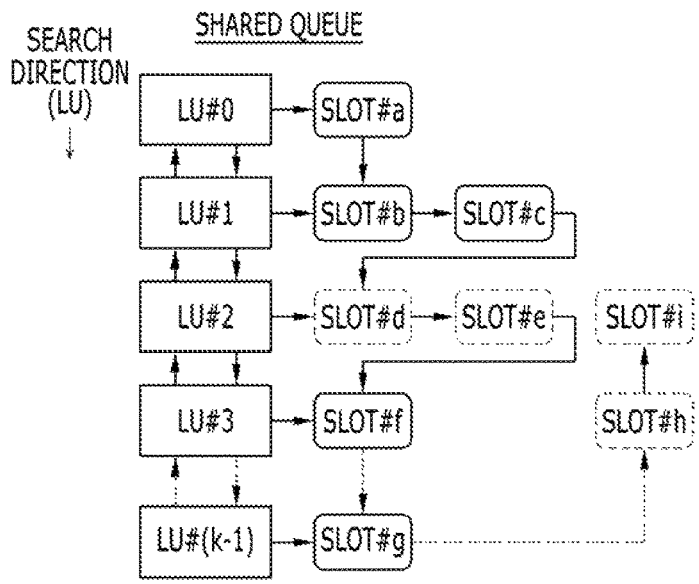
FIG. 8 illustrates a task processing operation in accordance with another embodiment of the present invention.

FIG. 8 illustrates a task processing operation in accordance with another embodiment of the present invention. In this embodiment, the task processing operation is performed based on the shared queue scheme.

Referring to FIG. 8, the shared queue scheme is a method of storing tasks or slots in the logical units (LU) or queues in the order that the tasks are received and performing the tasks or slots in that order. For example, a slot SLOT#a corresponding to a logical unit LU#0 is processed; a slot SLOT#b and a slot SLOT#c corresponding to a logical unit LU#1 are processed; a slot SLOT#d and a slot SLOT#e corresponding to a logical unit LU#2 are processed; and a slot SLOT#f corresponding to a logical unit LU#3 is processed. Subsequently, a slot SLOT#g corresponding to a logical unit LU#(k−1) is processed. Then, a slot SLOT#h corresponding to a logical unit LU#3 is processed; and a slot SLOT#i corresponding to a logical unit LU#2 is processed.

According to the shared queue scheme, the controller 130 may store the tasks that are transferred from the host 102 in the logical units or queues for the memory device 150 and process the tasks in the order that the tasks are received.

Moreover, the controller 130 may correspond priority orders to the slots corresponding to the logical units LU as shown in Table 6, when the shared queue scheme is used.

TABLE 6

| Slot | Order |
| --- | --- |
| SLOT #a | Ordered |
| SLOT #b | Priority1 |
| SLOT #c | Priority2 |
| SLOT #d | Priority1' |
| SLOT #e | Priority2' |
| SLOT #f | Simple1 |
| SLOT #g | Simple2 |
| SLOT #h | Simple1' |
| SLOT #i | Simple2' |

Figure 9:
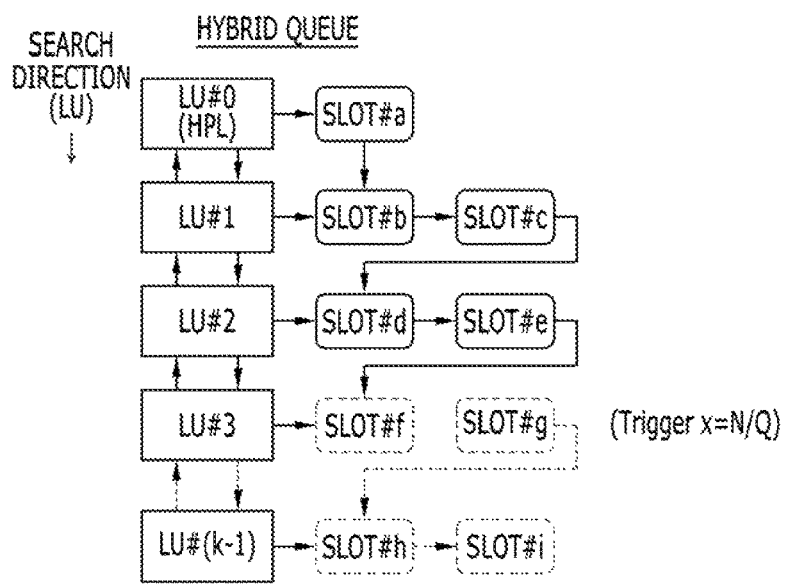
FIG. 9 illustrates a task processing operation in accordance with yet another embodiment of the present invention.

FIG. 9 illustrates a task processing operation in accordance with yet another embodiment of the present invention. In this embodiment, the task processing operation is performed based on the hybrid queue scheme.

Referring to FIG. 9, the hybrid queue scheme is a method of processing tasks which are the tasks are received from the host 102 based on the order that the tasks are received and their priority. That is, the controller 130 may store the tasks in the logical units LU based on the shared queue scheme, before the triggering point is reached. When the triggering point is reached, the controller 130 may process all the tasks that are received before and have been stored in the queues and then process the tasks that are received after the triggering point according to their priority. Furthermore, although it is illustrated that the controller 130 is processing the tasks in the shared queue scheme before the triggering point, it is also possible for the controller 130 to process the tasks in the per-logical unit queue scheme as well.

For example, the controller 130 may sequentially process a slot SLOT#a corresponding to a logical unit LU#0, a slot SLOT#b and a slot SLOT#c corresponding to a logical unit LU#1, and a slot SLOT#d and a slot SLOT#e corresponding to a logical unit LU#2, which correspond to the tasks that are received before the triggering point. Subsequently, the controller 130 may sequentially process a slot SLOT#f and a slot SLOT#g corresponding to a logical unit LU#3, and a slot SLOT#h and a slot SLOT#i corresponding to a logical unit LU#(k−1), which correspond to the tasks that are received after the triggering point.

Furthermore, the controller 130 may control the tasks to be performed in an ascending order of priority or in a descending order of priority. In short, the controller 130 may correspond the priority orders to the slots that correspond to the logical units LU, as shown in the following Table 7.

TABLE 7

| Slot | Order |
| --- | --- |
| SLOT #a | Ordered |
| SLOT #b | Priority1 |
| SLOT #c | Priority2 |
| SLOT #d | Simple1 |
| SLOT #e | Simple2 |
| SLOT #f | Priority1' |
| SLOT #g | Priority2' |
| SLOT #h | Simple1' |
| SLOT #i | Simple2' |

As described above, the embodiments of the present invention provide a method for reducing task miss by efficiently using logical units (LU) and processing old tasks appropriately. According to the method, a predetermined minimal number of tasks are received and then the tasks are performed based on their priority order, thereby maximizing task processing efficiency. Since the tasks of low priority order may be processed in an appropriate order, old queues are not neglected and data may be retained as much as possible even in a sudden power off situation or the system stops due to a system bug.

Hereinbelow, with reference to FIGS. 10 to 15, detailed descriptions will be made for electronic devices employing a memory system, according to various embodiments of the present invention.

Figure 10:
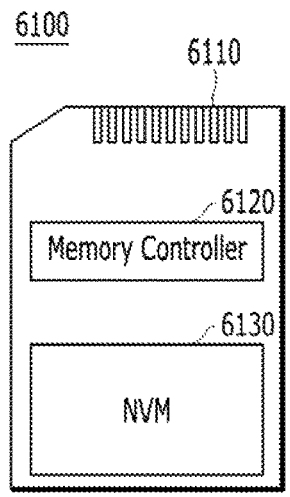
FIGS. 10 to 15 are block diagrams illustrating examples of a data processing system including a memory system according to an embodiment of the present invention.

FIG. 10 is a diagram illustrating an example of a data processing system including a memory system according to an embodiment of the present invention. For example, in FIG. 10, a memory card system 6100 employing a memory system is shown, according to an embodiment of the present invention.

Referring now to FIG. 10, the memory card system 6100 is provided, according to an embodiment of the present invention.

The memory card system 6100 may include a memory controller 6120, a memory device for example, nonvolatile memory (NVM) 6130, and a connector 6110.

The memory controller 6120 may be operatively connected with the memory device 6130. The memory controller 6120 may access the memory device 6130 for controlling the operations of the memory device 6130. For example, the memory controller 6120 may control the read, write, erase and background operations of the memory device 6130. The memory controller 6120 is also configured to provide an interface between the memory device 6130 and a host (not shown) via the connector 6110. The memory controller 6120 may drive a firmware for controlling the memory device 6130.

The memory controller 6120 may correspond to the controller 130 in the memory system 110 described above with reference to FIG. 1C, and the memory device 6130 may correspond to the memory device 150 in the memory system 110 described above with reference to FIG. 1C.

Therefore, the memory controller 6120 may include components such as a random access memory (RAM), a processing unit, a host interface, a memory interface and an error correction unit.

The memory controller 6120 may communicate with an external device, for example, the host 102 described above with reference to FIG. 1C, through the connector 6110. For example, as described above with reference to FIG. 1C, the memory controller 6120 may be configured to communicate with the external device through at least one of various communication protocols such as universal serial bus (USB), multimedia card (MMC), embedded MMC (eMMC), peripheral component interconnection (PCI), PCI-express (PCI-E), Advanced Technology Attachment (ATA), Serial-ATA, Parallel-ATA, small computer system interface (SCSI), enhanced small disk interface (ESDI), Integrated Drive Electronics (IDE), Firewire, universal flash storage (UFS), wireless fidelity (WI-FI) and Bluetooth. Accordingly, the memory system and the data processing system, according to an embodiment, may be applied to wired/wireless electronic appliances, and in particular, a mobile electronic appliance.

The memory device 6130 may be a nonvolatile memory (NVM). For example, the memory device 6130 may be one of various nonvolatile memory devices such as an erasable and programmable ROM (EPROM), an electrically erasable and programmable ROM (EEPROM), a NAND flash memory, a NOR flash memory, a PRAM, a resistive RAM (ReRAM), a ferroelectric RAM (FRAM) and a spin torque transfer magnetic RAM (STT-MRAM).

The memory controller 6120 and the memory device 6130 may be integrated into a single semiconductor device. For example, the memory controller 6120 and the memory device 6130 may form a solid state driver (SSD) by being integrated into a single semiconductor device. Furthermore, the memory controller 6120 and the memory device 6130 may form a memory card such as a PC card (for example, Personal Computer Memory Card International Association; PCMCIA), a compact flash card (CF), a smart media card (SM and SMC), a memory stick, a multimedia card (for example, MMC, RS-MMC, MMCmicro and eMMC), an SD card (for example, SD, miniSD, microSD and SDHC) and a universal flash storage (UFS).

Figure 11:
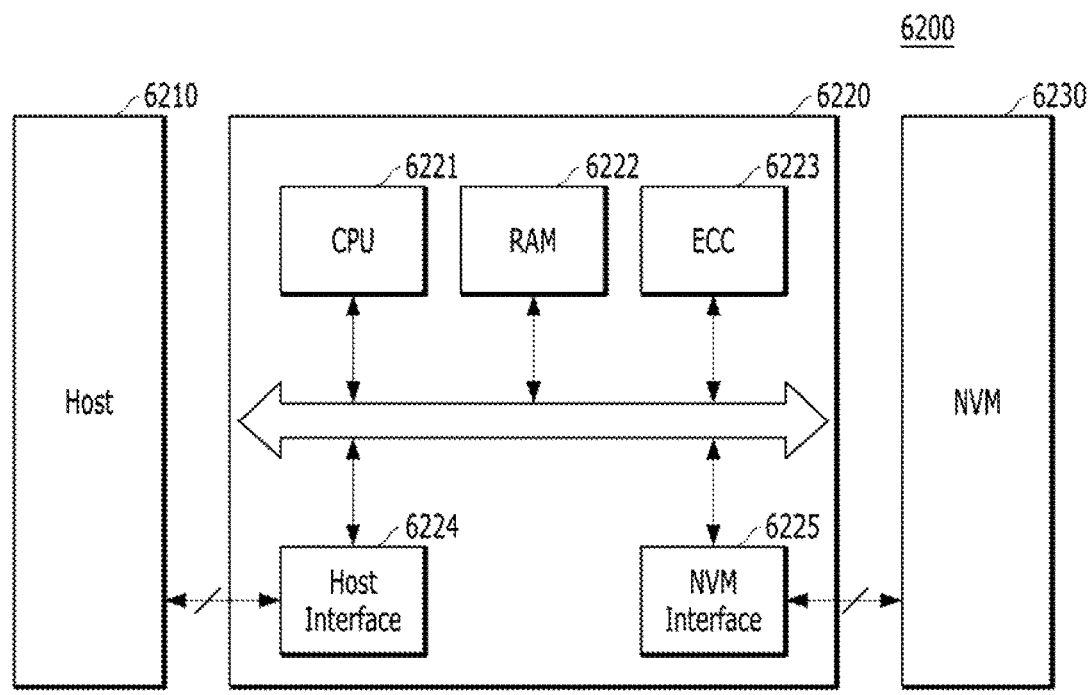

FIG. 11 is a diagram illustrating another example of a data processing system 6200 including a memory system according to an embodiment of the present invention.

Referring to FIG. 11, the data processing system 6200 may include a memory device 6230 which is implemented by at least one nonvolatile memory (NVM) and a memory controller 6220 which controls the memory device 6230. The data processing system 6200 shown in FIG. 11 may be a storage medium such as a memory card for example, a CF, a SD or a microSD, as described above with reference to FIG. 1C. The memory device 6230 may correspond to the memory device 150 in the memory system 110 described above with reference to FIG. 1C. The memory controller 6220 may correspond to the controller 130 in the memory system 110 described above with reference to FIG. 1C.

The memory controller 6220 may control the operations for the memory device 6230 including read, write and erase operations in response to commands received from a host 6210. The memory controller 6220 may include at least one of a central processing unit (CPU) 6221, a buffer memory, for example, a random access memory (RAM) 6222, an error correction code (ECC) circuit 6223, a host interface 6224, and a memory interface, for example, an NVM interface 6225, all electrically coupled via an internal bus.

The CPU 6221 may control the operations for the memory device 6230 such as read, write, file system management, bad page management, and so forth. The RAM 6222 may operate according to control of the CPU 6221, and may be used as a work memory, a buffer memory, a cache memory, or the like. In the case in which the RAM 6222 is used as a work memory, data processed by the CPU 6221 is temporarily stored in the RAM 6222. In the case in which the RAM 6222 is used as a buffer memory, the RAM 6222 may be used to buffer data to be transmitted from the host 6210 to the memory device 6230 or from the memory device 6230 to the host 6210. In the case in which the RAM 6222 is used as a cache memory, the RAM 6222 may be used to enable the memory device 6230 with a low speed to operate at a high speed.

The ECC circuit 6223 may correspond to the ECC unit 138 of the controller 130 described above with reference to FIG. 1C. As described above with reference to FIG. 1, the ECC circuit 6223 may generate an error correction code (ECC) for correcting a fail bit or an error bit in the data received from the memory device 6230. Also, the ECC circuit 6223 may perform error correction encoding for data to be provided to the memory device 6230, and generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1C, the ECC circuit 6223 may correct errors by using one of various coded modulations such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) and a Block coded modulation (BCM).

The memory controller 6220 may transmit and receive data to and from the host 6210 through the host interface 6224, and transmit and receive data to and from the memory device 6230 through the NVM interface 6225. The host interface 6224 may be connected with the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. Further, as a wireless communication function or a mobile communication protocol such as wireless fidelity (WI-FI) or long term evolution (LTE) is implemented, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to the embodiment may be applied to wired/wireless electronic appliances, and in particular, a mobile electronic appliance.

Figure 12:
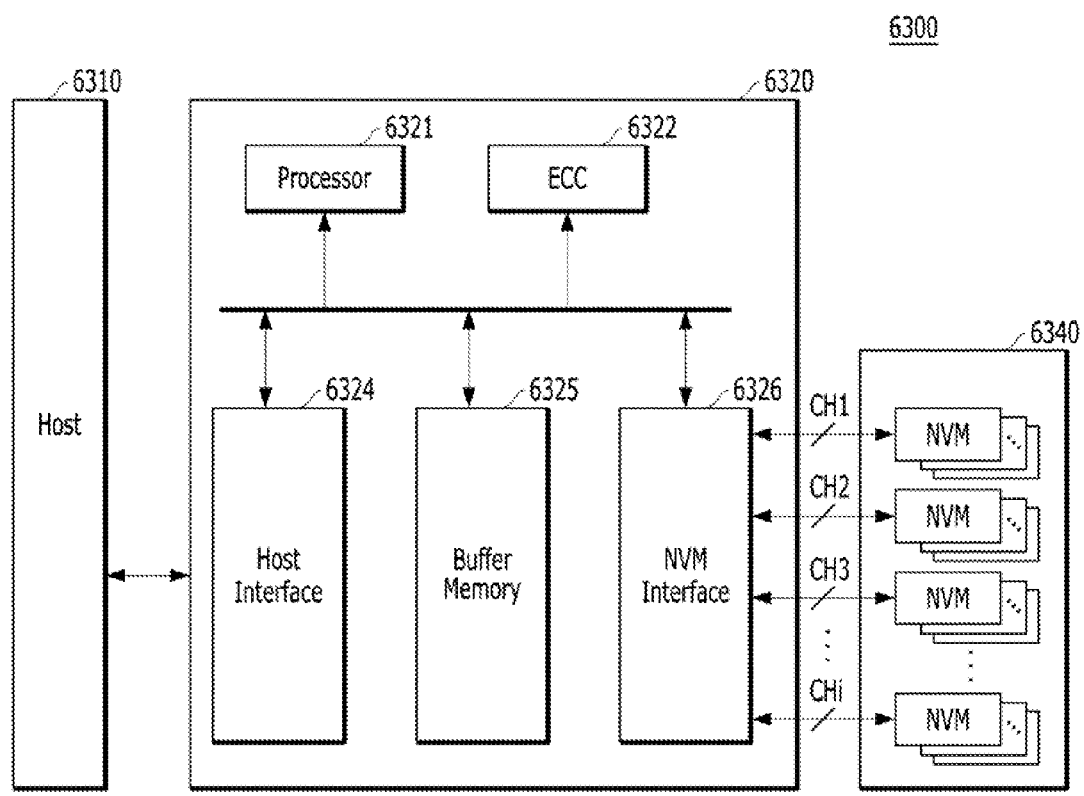

FIG. 12 is a diagram illustrating another example of a data processing system including a memory system according to an embodiment of the present invention. For example, in FIG. 12, a solid state drive (SSD) 6300 employing a memory system is shown, according to an embodiment of the present invention.

Referring to FIG. 12, the SSD 6300 may include a memory device 6340 which may include a plurality of nonvolatile memories (NVM), and a controller 6320. The controller 6320 may correspond to the controller 130 in the memory system 110 described above with reference to FIG. 1C. The memory device 6340 may correspond to the memory device 150 in the memory system 110 described above with reference to FIG. 1C.

The controller 6320 may be connected with the memory device 6340 through a plurality of channels CH1, CH2, CH3, . . . CHi. The controller 6320 may include at least one of a processor 6321, a buffer memory 6325, an error correction code (ECC) circuit 6322, a host interface 6324, and a memory interface such as a nonvolatile memory (NVM) interface 6326.

The buffer memory 6325 may temporarily store data received from a host 6310 or data received from a plurality of nonvolatile memories NVM included in the memory device 6340, or temporarily store metadata of the plurality of nonvolatile memories NVM. For example, the metadata includes map data including mapping tables. The buffer memory 6325 may be implemented by a volatile memory such as, but not limited to, a dynamic random access memory (DRAM), a synchronous dynamic random access memory (SDRAM), a double data rate (DDR) SDRAM, a low power double data rate (LPDDR) SDRAM and a graphic random access memory (GRAM) or a nonvolatile memory such as, but not limited to, a ferroelectric random access memory (FRAM), a resistive random access memory (ReRAM), a spin-transfer torque magnetic random access memory (STT-MRAM) and a phase change random access memory (PRAM). Although it is illustrated in FIG. 12, as an example, that the buffer memory 6325 is disposed inside the controller 6320, it is noted that the buffer memory 6325 may be disposed outside the controller 6320.

The ECC circuit 6322 calculates error correction code values of data to be programmed in the memory device 6340 in a program operation, performs an error correction operation for data read from the memory device 6340 based on the error correction code values in a read operation, and performs an error correction operation for data recovered from the memory device 6340 in a recovery operation for failed data.

The host interface 6324 provides an interface function with respect to an external device such as the host 6310. The nonvolatile memory interface 6326 provides an interface function with respect to the memory device 6340 which is connected through the plurality of channels CH1, CH2, CH3, . . . CHi.

In an embodiment, a redundant array of independent disks (RAID) system is provided, the system including a plurality of SSDs 6300. Each SSD 6300 may employ the memory system 110 described above with reference to FIG. 1C. In a RAID system, the plurality of SSDs 6300 and a RAID controller for controlling the plurality of SSDs 6300 may be included. In the case of performing a program operation by receiving a write command from the host 6310, the RAID controller may select at least one memory system, that is, at least one SSD 6300, corresponding to the RAID level information of the write command received from the host 6310, among a plurality of RAID levels, that is, the plurality of SSDs 6300, and may output data corresponding to the write command, to the selected SSD 6300. Also, in the case of performing a read operation by receiving a read command from the host 6310, the RAID controller may select at least one memory system, that is, at least one SSD 6300, corresponding to the RAID level information of the write command received from the host 6310, among the plurality of RAID levels, that is, the plurality of SSDs 6300, and may provide data outputted from the selected SSD 6300, to the host 6310.

Figure 13:
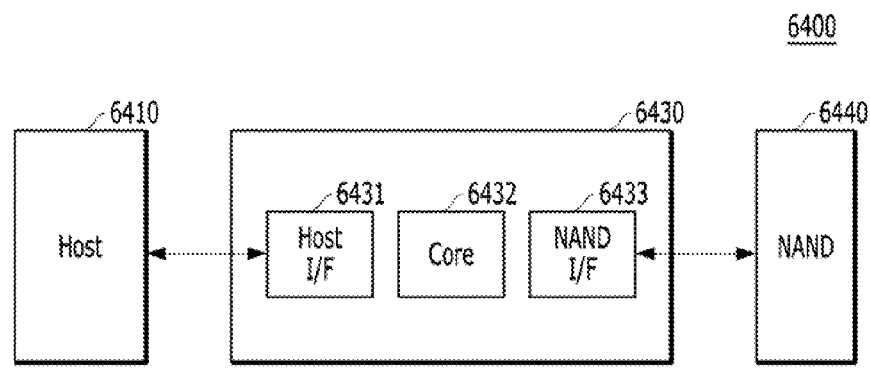

FIG. 13 is a diagram illustrating another example of a data processing system including a memory system, according to an embodiment of the present invention. For example, in FIG. 13, an embedded multimedia card (eMMC) 6400 employing a memory system is shown, according to an embodiment of the present invention.

Referring to FIG. 13, the eMMC 6400 may include a memory device 6440 which is implemented by at least one NAND flash memory, and a controller 6430. The controller 6430 may correspond to the controller 130 in the memory system 110 described above with reference to FIG. 1C. The memory device 6440 may correspond to the memory device 150 in the memory system 110 described above with reference to FIG. 1C.

The controller 6430 may be connected with the memory device 6440 through a plurality of channels indicated by the two headed arrow. The controller 6430 may include a host interface 6431, at least one core 6432, and a memory interface, for example, a NAND interface 6433.

The core 6432 controls the operations of the eMMC 6400, the host interface 6431 provides an interface function between the controller 6430 and a host 6410, and the NAND interface 6433 provides an interface function between the memory device 6440 and the controller 6430. For example, the host interface 6431 may be a parallel interface such as an MMC interface, as described above with reference to FIG. 1C, or may be a serial interface such as an ultra-high speed (UHS)-I/UHS-II and a universal flash storage (UFS) interface.

Figure 14:
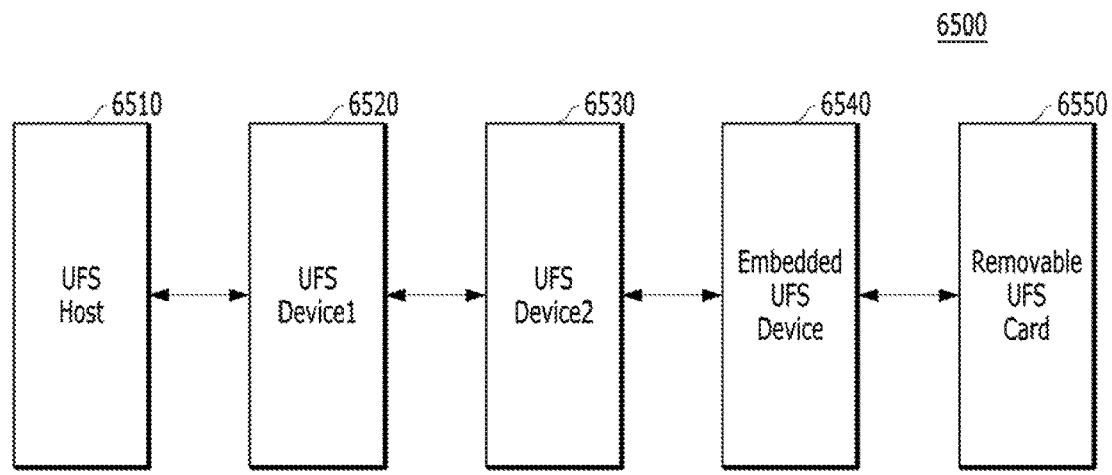

FIG. 14 is a diagram illustrating another example of a data processing system including a memory system, according to an embodiment of the present invention. For example, in FIG. 14, a universal flash storage (UFS) system 6500 employing a memory system is shown, according to an embodiment of the invention.

Referring to FIG. 14, the UFS system 6500 may include a UFS host 6510, a plurality of UFS devices 6520 and 6530, an embedded UFS device 6540, and a removable UFS card 6550. The UFS host 6510 may be an application processor of wired/wireless electronic appliances, and in particular, a mobile electronic appliance.

The UFS host 6510, the UFS devices 6520 and 6530, the embedded UFS device 6540 and the removable UFS card 6550 may respectively communicate with external devices, that is, wired/wireless electronic appliances, and in particular, a mobile electronic appliance, through a UFS protocol. The UFS devices 6520 and 6530, the embedded UFS device 6540 and the removable UFS card 6550 may be implemented as the memory system 110 described above with reference to FIG. 1C, and in particular, as the memory card system 6100 described above with reference to FIG. 10. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), a multimedia card (MMC), secure digital (SD), mini SD and Micro SD.

Figure 15:
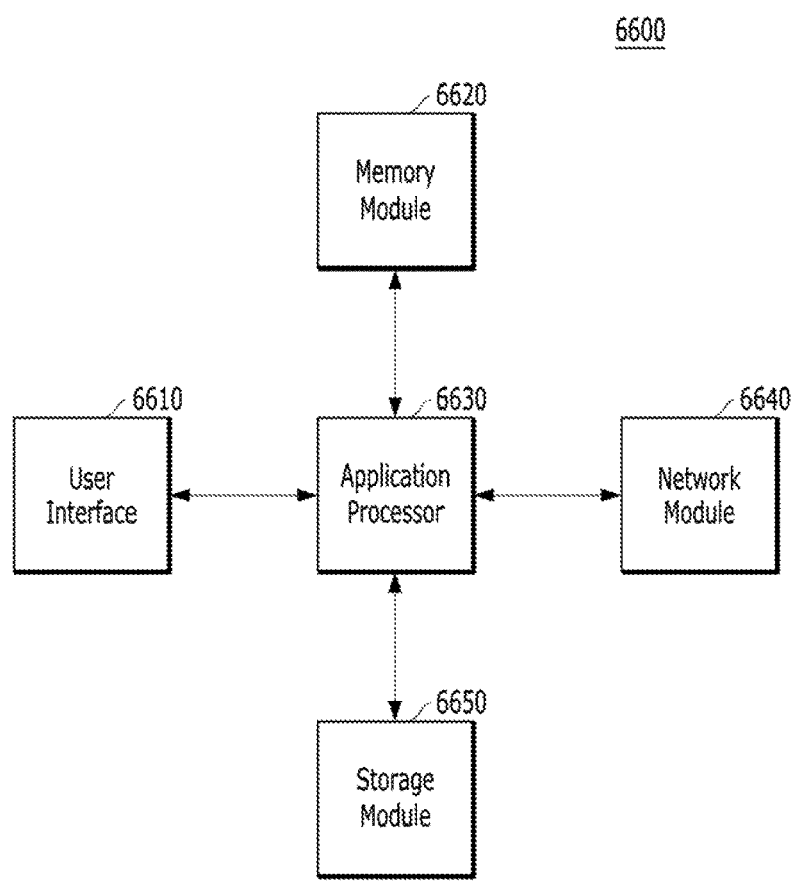

FIG. 15 is a diagram illustrating another example of a data processing system including a memory system according to an embodiment of the present invention. For example, in FIG. 15, a user system 6600 employing a memory system is shown, according to an embodiment of the present invention.

Referring to FIG. 15, the user system 6600 may include a user interface 6610, a memory module 6620, an application processor 6630, a network module 6640, and a storage module 6650.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided as a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, an low power double data rate (LPDDR) SDRAM, an LPDDR2 SDRAM and an LPDDR3 SDRAM or a nonvolatile random access memory such as a phase change random access memory (PRAM), a ReRAM, a magnetic random access memory (MRAM) and a ferroelectric random access memory (FRAM). For example, the application processor 6630 and the memory module 6620 may be mounted as a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), and so on, and may thereby communicate with wired/wireless electronic appliances, and in particular, a mobile electronic appliance. Accordingly, the memory system and the data processing system may be applied to wired/wireless electronic appliances. The network module 6640 may be included in the application processor 6630.

The storage module 6650 may store data such as data received from the application processor 6630, and transmit data stored therein, to the application processor 6630. The storage module 6650 may be implemented by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6650 may also be provided as a removable storage medium such as a memory card of the user system 6600 and an external drive. That is, the storage module 6650 may correspond to the memory system 110 described above with reference to FIG. 1C, and may be implemented as the SSD, eMMC and UFS described above with reference to FIGS. 12 to 14.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

In the case in which the memory system 110 described above with reference to FIG. 1C is applied to the mobile electronic appliance of the user system 6600 according to an embodiment, the application processor 6630 may control the operations of the mobile electronic appliance, and the network module 6640 as a communication module controls wired/wireless communication with an external device, as described above. The user interface 6610 as the display/touch module of the mobile electronic appliance displays data processed by the application processor 6630 or supports input of data from a touch panel.

While the present invention has been described with respect to the specific embodiments, it will be apparent to those skilled in the art that various changes and modifications may be made without departing from the spirit and scope of the invention as defined in the following claims.

What is claimed is:

1. An apparatus, comprising:
   a receiver suitable for receiving a plurality of tasks from a host;
   a memory suitable for storing the plurality of tasks; and
   a task processor suitable for determining whether a triggering point is reached based on a count of the plurality of tasks and a predetermined number of effective queues, re-arranging the plurality of the tasks, stored in the memory, based on either one scheme between a first queue scheme or a second queue scheme before the triggering point is reached or the other scheme between the first queue scheme and the second queue scheme after the triggering point is reached, and performing the re-arranged tasks in the memory,
   wherein the task processor re-arranges and processes received tasks based on one scheme between the first queue scheme or the second queue scheme before the triggering point that is determined based on the number of the plurality of the tasks and the predetermined number of effective queues, and
   after the triggering point, the task processor receives a predetermined number of tasks and processes the received predetermined number of the tasks based on a priority order,
   wherein the priority order includes:
      a first priority order representing a task that is requested by the host;
      a second priority order representing a task that is related to system data or marked with a high priority order, where the second priority order is lower than the first priority order; and
      a third priority order representing a task that is related to one of a data read operation and a data write operation, where the third priority order is lower than the second priority order.

2. The apparatus of claim 1, wherein the apparatus includes one of a mobile device and a storage device.

3. The apparatus of claim 1, wherein the apparatus includes the storage device which includes a memory device, and
   the first queue scheme includes a scheme that the received tasks are matched to and stored in a plurality of queues of logical units for the memory device, and the queues of the logical units are sequentially searched and processed.

4. The apparatus of claim 1, wherein the apparatus includes the storage device which includes a memory device, and
   the second queue scheme includes a scheme that the received tasks are stored in a plurality of queues for the memory device and processed in an order that the tasks are received.

5. The apparatus of claim 1, wherein the triggering point is determined by a quotient in a calculation of N/Q, where N represents the total number of the plurality of the tasks, and Q is a predetermined ratios of the number of the effective queues.

6. A memory system, comprising:
   a memory device; and
   a controller,
   wherein the controller comprises:
      a receiver suitable for receiving a plurality of tasks from a host;
      a memory suitable for storing the plurality of tasks; and
      a task processor suitable for determining whether a triggering point is reached based on a count of the plurality of tasks and a predetermined number of effective queues, re-arranging the plurality of the tasks, stored in the memory, based on either one scheme between a first queue scheme or a second queue scheme before the triggering point is reached or the other scheme between the first queue scheme and the second queue scheme after the triggering point is reached, and performing the re-arranged tasks in the memory,
   wherein the task processor re-arranges and processes received tasks based on one scheme between the first queue scheme or the second queue scheme before the triggering point that is determined based on the number of the plurality of the tasks and the predetermined number of effective queues, and after the triggering point, the task processor receives a predetermined number of tasks and processes the received predetermined number of the tasks based on a priority order, wherein the priority order includes:
- a first priority order representing a task that is requested by the host;
- a second priority order representing a task that is related to system data or marked with a high priority order, where the second priority order is lower than the first priority order; and
- a third priority order representing a task that is related to one of a data read operation and a data write operation, where the third priority order is lower than the second priority order.

7. The memory system of claim 6, wherein the first queue scheme includes a scheme that the received tasks are matched to and stored in a plurality of queues of logical units for the memory device, and the queues of the logical units are sequentially searched and processed.

8. The memory system of claim 6, wherein the second queue scheme includes a scheme that the received tasks are stored in a plurality of queues for the memory device and processed in an order that the tasks are received.

9. The memory system of claim 6, wherein the triggering point is determined by a quotient in a calculation of N/Q, where N represents the total number of the plurality of the tasks, and Q is a predetermined ratios of the number of the effective queues.

10. A method for operating a memory system including a memory device and a controller, comprising:
- receiving a plurality of tasks from a host;
- storing the plurality of tasks in a memory;
- determining whether a triggering point is reached based on a count of the plurality of tasks and a predetermined number of effective queues;
- re-arranging the plurality of the tasks, stored in the memory, based on either one scheme between a first queue scheme or a second queue scheme before the triggering point is reached or the other scheme between the first queue scheme and the second queue scheme after the triggering point is reached; and
- performing the re-arranged tasks in the memory, wherein the re-arranging of the plurality of the tasks includes:
- re-arranging and processing received tasks based on one scheme between the first queue scheme or the second queue scheme before the triggering point that is determined based on the number of the plurality of the tasks and the predetermined number of effective queues; and
- after the triggering point, receiving a predetermined number of tasks and processing the received predetermined number of the tasks based on a priority order, wherein the priority order includes:
- a first priority order representing a task that is requested by the host;
- a second priority order representing a task that is related to system data or marked with a high priority order, where the second priority order is lower than the first priority order; and
- a third priority order representing a task that is related to a data read operation and a data write operation, where the third priority order is lower than the second priority order.

11. The method of claim 10, wherein the first queue scheme includes a scheme that the received tasks are matched to and stored in a plurality of queues of logical units for the memory device, and the queues of the logical units are sequentially searched and processed.

12. The method of claim 10, wherein the second queue scheme includes a scheme that the received tasks are stored in a plurality of queues for the memory device and processed in an order that the tasks are received.

13. The method of claim 10, wherein the triggering point is determined by a quotient in a calculation of N/Q, where N represents the total number of the plurality of the tasks, and Q is a predetermined ratios of the number of the effective queues.

* * * * *